(12) United States Patent
Lindstrom

(10) Patent No.: US 7,600,347 B2
(45) Date of Patent: Oct. 13, 2009

(54) EMERGENCY STRUCTURE RESTRAINT SYSTEM

(76) Inventor: Mikael Lindstrom, 1331 S. Federal Hwy., Lake Worth, FL (US) 33460

( * ) Notice: Subject to any disclaimer, the term of this patent is extended or adjusted under 35 U.S.C. 154(b) by 117 days.

(21) Appl. No.: 11/504,193

(22) Filed: Aug. 15, 2006

(65) Prior Publication Data
US 2008/0040981 A1 Feb. 21, 2008

(51) Int. Cl.
E04D 1/34 (2006.01)
E04B 7/00 (2006.01)
E02D 5/74 (2006.01)

(52) U.S. Cl. .............. 52/4; 52/23; 52/155; 52/DIG. 11; 52/DIG. 12

(58) Field of Classification Search ............ 52/23, 52/222, 3, 4, 5, 223.13, 146, 155, 157, DIG. 11, 52/DIG. 12
See application file for complete search history.

(56) References Cited

U.S. PATENT DOCUMENTS

| | | | | |
|---|---|---|---|---|
| 2,455,237 | A * | 11/1948 | Davis | 410/97 |
| 3,335,531 | A * | 8/1967 | Grimelli et al. | 52/23 |
| 3,726,054 | A * | 4/1973 | Anderson et al. | 52/23 |
| 3,845,597 | A * | 11/1974 | Foster | 52/166 |
| 3,949,527 | A * | 4/1976 | Double et al. | 52/4 |
| 4,897,970 | A * | 2/1990 | Double et al. | 52/4 |
| 5,522,184 | A * | 6/1996 | Oviedo-Reyes | 52/23 |
| 5,537,786 | A * | 7/1996 | Lozier et al. | 52/23 |
| 5,570,545 | A * | 11/1996 | Adams | 52/23 |
| 5,623,788 | A * | 4/1997 | Bimberg et al. | 52/23 |
| 5,687,512 | A * | 11/1997 | Spoozak et al. | 52/23 |
| 5,791,090 | A * | 8/1998 | Gitlin et al. | 52/4 |
| 5,799,680 | A * | 9/1998 | Dorflinger | 135/96 |
| 5,819,477 | A * | 10/1998 | Gaffney | 52/23 |
| 5,881,499 | A * | 3/1999 | Luzzi | 52/23 |
| 6,088,975 | A * | 7/2000 | Wiegel | 52/169.1 |
| 6,343,449 | B1 * | 2/2002 | MacKarvich | 52/293.3 |
| 6,418,685 | B1 * | 7/2002 | Oliver et al. | 52/293.3 |
| 6,453,621 | B1 * | 9/2002 | Bundy et al. | 52/3 |
| 6,722,085 | B2 * | 4/2004 | Pittman | 52/23 |
| 6,799,593 | B2 * | 10/2004 | Kendro, Jr. | 135/95 |
| 6,820,373 | B1 * | 11/2004 | Bundy et al. | 52/1 |
| 6,865,852 | B2 * | 3/2005 | Gower | 52/222 |
| 6,928,783 | B2 * | 8/2005 | Oliver et al. | 52/699 |
| 6,955,243 | B1 * | 10/2005 | Huff | 182/107 |
| 7,310,913 | B2 * | 12/2007 | Pierce | 52/23 |
| 2002/0083660 | A1 * | 7/2002 | Oliver et al. | 52/169.9 |
| 2002/0134414 | A1 * | 9/2002 | Gower | 135/90 |
| 2002/0166289 | A1 * | 11/2002 | Oviedo-Reyes | 52/4 |
| 2006/0075690 | A1 * | 4/2006 | Murray | 52/23 |
| 2006/0207191 | A1 * | 9/2006 | Sutton | 52/4 |

OTHER PUBLICATIONS

StormBlok Systems. Photo/text, StormBlok Systems, Inc. [retrieved on Oct. 25, 2007] 2 pages <http:www.stormblok.com/products.php.

(Continued)

Primary Examiner—Richard E Chilcot, Jr.
Assistant Examiner—Andrew J Triggs
(74) Attorney, Agent, or Firm—Frank B. Arenas

(57) ABSTRACT

An device, system and method of using is disclosed to provide a releasably attached external tension member(s), earth anchor(s), net(s), means for adjusting and means for attaching to the earth anchor(s) to accomplish an emergency structure restraint system.

14 Claims, 3 Drawing Sheets

OTHER PUBLICATIONS

Hurricane Harness. Photo/text, Hurricane Harness, Inc. [retrieved on Oct. 25, 2007] 2 pages <http:www.hurricaneharness.com>.

StormNet. Photo/text, StormNet LLC [retrieved om Oct. 25, 2007] 4 pages <http:www.stromnetusa.com>.

CAT 5 Hurricane Netting System. Photo/text, [retrieved on Jun. 11, 2008] 15 pages <http://72.17.158.10/roof.cfm>.

Darrell R. Tullar. email from 3rd party—1 page—received on Mar. 19, 2008.

Fortress 5. Photo/text. [retrieved Jun. 11, 2008] 4 pages <http://www.fortressfive.com/index.html>.

Mike Bachynski. Text. [retrieved on Jun. 11, 2008] 2 pages <http://www.freepatentauction.com/patent.php?nb=926>.

Author Unknown. Photo/text. [retrieved Jun. 11, 2008] 4 pages <http://ebtx.com/mech/hurrican.htm>.

Fastnet. Photo/text. [retrieved Jun. 11, 2008] 8 pages <http://www.fastnetroofprotection.co.uk/>.

Tarps Plus. Photo/text. [retrieved Jun. 11, 2008] 3 pages <http://www.tarpsplus.com/hurricanetarps.html>.

FreshPatents.com. Text. [retrieved Jun. 11, 2008] 3 pages <http://www.freshpatents.com/Hurricane-protection-harness-dt20070201ptan20070022672.php>.

Wind Straps. Photo/text. [retrieved Jun. 11, 2008] 2 pages <http://www.windstraps.com/>.

PCT International Search Report, 8 pages, mailing date Aug. 6, 2008.

International Bureau, PCT International Preliminary Report on Patentability—mail date Feb. 26, 2009—PCT/US2007/015354.

* cited by examiner

EMERGENCY STRUCTURE RESTRAINT SYSTEM

COPYRIGHT NOTICE

A portion of the disclosure of this patent document, including Appendices, contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

This invention relates generally to an apparatus (an article of manufacture) and method of use. The present invention particularly relates to structure restraint systems and accessories used in conjunction therein. The present invention more particularly relates to a device, system and method of using a structure restraint system to solve the problem of roof and/or structure damage due to inclement weather, natural forces and acts of God.

DESCRIPTION OF THE PRIOR ART

Internal restraint systems are commonly used in modern buildings to resist wind, earthquake and other loads. Especially in south Florida and the Gulf of Mexico, which had record hurricanes in 2004, the building codes are increasingly becoming required to enable buildings and structures for 140 MPH (miles per hour) wind loads.

Accordingly, it is understood that one skilled in the art would know that most new building codes in high-wind areas require the structure to be physically connected contiguously from the roof to the foundation. The old art uses "hurricane clips" to tie the rafters or trusses to the top of the bearing wall and the bearing wall then anchored to the foundation. This generally works well but not when needed in emergencies during the time of high wind and/or other natural forces exceed normal design specifications, i.e. the few days during which the hurricane path is close enough to impart destructive wind forces exceeding design strength. It is expensive and inefficient to design and build buildings and/or structures (houses, offices, warehouses, storage buildings, industrial plants, retail stores, aircraft hangars, etc.) for the maximum need (140 MPH or higher) when this strength is only needed a rarely for a few days at a time. Additionally, older homes were designed to withstand much lower speed winds and need an external emergency restraint system to enhance the roof's resistance to 140 MPH wind force, such as this invention accomplishes.

Also, previous devices and systems also do not prevent the loss of typical residential roof shingles. The problem to be solved is preventing roof shingles from being "stripped" from a sloped roof by the high winds for short periods of time. Thus, a need exists in the industry for a device and system that may be quickly installed externally to be used in these relatively short durations of high climatic forces. Versions of this new and useful invention solve this need.

U.S. Pat. No. 6,722,085 discloses a Mobile Home Tie-Down Apparatus.

No prior art is known to this inventor that discloses a selectably attachable emergency device and/or system installed externally over the structural skeleton that makes it possible to restrain roof shingles, roofs and buildings/structures under emergency climatic conditions while attached, then released, removed and stored for future use during normal climatic conditions. Since versions of the device and system are only utilized during the actual times needed, the aesthetics of the building/structure are unchanged during average wind conditions. This new and useful invention solves the problems of securely restraining roof shingles, roofs, and buildings/structures, alone or in combination, during emergency climatic periods when needed while not affecting the artistic elements of the building/structure when not needed.

BRIEF SUMMARY OF THE INVENTION

It is an object of the benefits and features of versions of this invention to help prevent the "stripping" of shingles from building/structure roofs during high winds.

It is another object of the benefits and features of versions of this invention to help restrain the roof, roof system and building/structure during high winds and other types of inclement weather with a releasably attached external structure restraint system that may be removed and stored when not needed.

At least one, some or all of the objects of this invention are achieved, in several embodiments, with this new and useful emergency external structure restraint device and system. This external structure restraint device and system is lightweight, compact when stored and of simple construction that is easy to make and use.

BRIEF DESCRIPTION OF THE DRAWINGS

In the manner in which the above-recited and other advantages and objects of versions of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
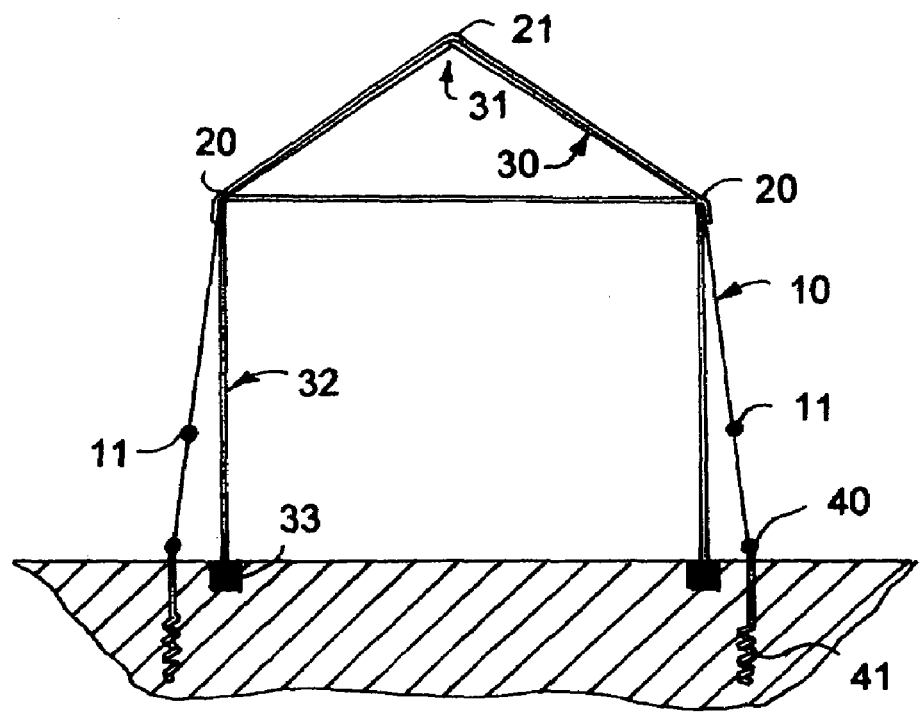
FIG. 1 is a sectional view of an embodiment of the external structure restraint device and system constructed in accordance with one embodiment of the present invention, showing an eave with no overhang. Eaves with overhangs may also be used.

While the present invention will be described with reference to the details of the embodiments of the invention shown in the drawings (and some embodiments not shown in the drawings), these details are not intended to limit the scope of the invention.

DETAILED DESCRIPTION OF THE PREFERRED EMBODIMENT

The apparatus of the invention is conveniently fabricated in the preferred embodiment by conventional and standard methods of fastening, weaving, winding, seaming, installing, joining and finishing in the metal, wire, netting, textile and earth anchoring fabrication arts using conventional and standard materials.

For example, the external structure restraint device and system and incorporated components may be fabricated from wood, aluminum, steel, stainless steel and/or other like metals or any other suitable material as will be readily apparent to one of ordinary skill in the art. Versions of the present invention (or components of) may also be fabricated in best mode from non-metallic materials for lighter weight, reduced cost and resistance to corrosion. These non-metallic materials include, among others, conventional polymers such as, for example, polystyrene, polycarbonate, polyurethane, polyethylene, phenol formaldehyde resins, polybutylene, Teflon and the like.

Plastics (any one of a large and varied group of materials consisting wholly or in part of combinations of carbon with hydrogen, oxygen, nitrogen and other organic and inorganic elements; while solid in the finished state, at some stage in its manufacture, it is made liquid, and thus capable of being formed into various shapes, usually through the application of heat and/or pressure), such as monomer (one unit—the building block for polymer molecules) or polymer (many monomer units strung together to make long molecules) used in polymerization (the process of combining short molecules to make long molecules) may be used.

Thermoplastics (plastics that can be repeatedly softened and hardened by heating and cooling) as well as Thermosets (plastics that are cross-linked during polymerization and cannot be softened without degrading some linkages) may also be used.

Thermoplastic resin types such as crystalline (thermoplastics containing areas of dense molecular alignments known as crystallinity), amorphous (thermoplastics with no crystallinity in the solid state), liquid crystal polymers (LCPs) (stiff, rod-like structures organized in large paralleled arrays in both melted and solid states) may also be used.

All components may be referenced in plural for convenience, as only at least one of all components are necessary, if desired, for proper operation and use in other embodiments. Ideally, all components (or some components) are fabricated from non-metallic materials as previously mentioned above. Other materials and methods that can be used are stainless steel cables, textile threads made from materials standard in the textile industry such as nylon webbing, nylon thread, Kevlar thread, cotton thread, canvas material, nets and/or netting materials made from any of the above-referenced materials, which is meant to be illustrative and not intended to be limiting as to the types of materials that may be used to practice versions of the invention. These materials may be formed into thread, strap, rope, net, web, band, cord, string, leash, belt, braid, mesh and pliable membranes.

The earth anchor may be fabricated from suitable metal in the form of screw-anchors for mobile homes, flap-type anchors, concrete foundation or other type means for anchoring. For example, an earth anchor such as one available by General Supply, 3902 Hanna Circle—Suite A, Indianapolis, Ind. 46241, Phone: (317) 856-4300, Toll Free: (800) 479-2754, Fax: (317) 856-1012, Email: customersvc@generalsupplyinc.com, the ¾"×30" E-Z Set Anchor by Tie Down Engineering. Other Tie Down Engineering, Inc. (5901 Wheaton Drive, Atlanta, Ga. 30336) models that may be used are models MI 2H, MI 2H6, MI 22, MRA, MRAX 48 and related accessories, which are listed as illustrative only and not intended to be limiting as to the types of earth anchors that may used to practice versions of the invention. Appendix A attached also list other anchors which may be used, which are listed as illustrative only and not intended to be limiting as to the types of earth anchors that may used to practice versions of the invention. All anchors with suitable resistance to the desired climatic forces may be used. All components of the device and/or system are of sufficient strength to resist the desired climatic forces, i.e., wind speeds of 100 MPH, 120 MPH, 140 MPH or higher or any desired wind resistance strength.

Figure 2:
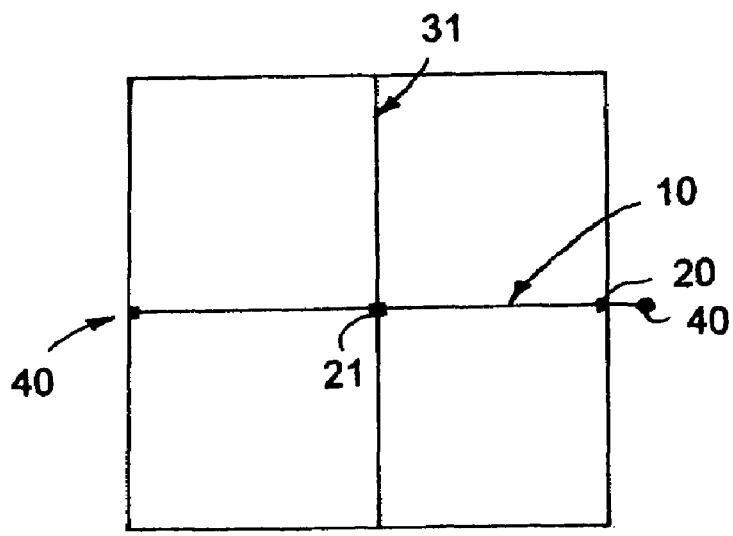
FIG. 2 is a plan view of an embodiment of the external structure restraint device and system constructed in accordance with one embodiment of the present invention.

Now, an overall description of the method of making and using one version of the invention will be described in detail. In one embodiment, as depicted in FIG. 1 and FIG. 2, at least one tension member, of sufficient strength to resist the desired climatic forces, further comprising a first tension member 10 (with a roof end 12 and an earth end 13) is attached to an attachment means 40 on an earth anchor means 41 (typically a mobile home screw-type anchor). The roof end 12 of the first tension member 10 is attached to the top tension member 14 over an eave cushion 20 disposed over the first roof eave 33 (with or without overhang) at the top of the bearing wall 32 which bears on the foundation 33. The top tension member 14 then is looped over the roof surface 30 and perpendicular to the roof ridge 31 over a ridge cushion 21 and then to another eave cushion 20 on the second roof eave 34 (with or without overhang), attached to the second tension member 15 which is attached to the attachment means 40 on another earth anchor means 41.

An optional means for adjusting 11 (such as a ratchet, pulley, friction device, come-along, turnbuckle and/or other suitable adjusting/tensioning device) may be used to tighten the system after installation to the desired-tautness. The means for adjusting may also be a spring-biased locking knob (with or without a plurality of longitudinally disposed apertures on an elongated length-adjustable bar), belt-buckle (with or without a plurality of longitudinally disposed apertures on an elongated length-adjustable bar), snap, fastener, touch-fastener (Velcro), quick-release mechanism or any other means for adjusting, all well known in the art as of today.

Figure 7:
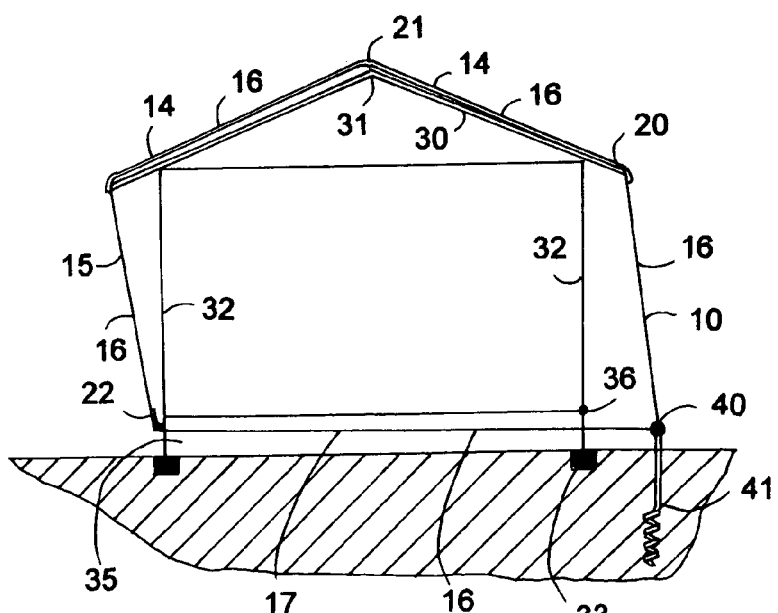
FIG. 7 is a sectional view of a structure with crawl space on pier foundations with at least one earth anchor set in a predetermined location upwind to resist a particular wind force vector.

Alternately, the external tension member may be one continuous tension member 16 (as shown in FIG. 7) comprising the first tension member 10, top tension member 14 and second tension member 15 and optional bottom tension member 17 all combined to comprise a single tension member, with or without a means for adjusting.

To install and use one version of the invention on a structure, typically the operator would first install the two earth anchors 41 on opposite ends of the structure as shown in FIG. 1 and FIG. 2. Then, for example as shown in FIG. 1, the first end of an external continuous tension member 16 (comprising the first tension member 10, top tension member 14 and second tension member 15 all combined, without the optional bottom tension member 17 in this example, to comprise a single tension member) is attached to the attachment means 40 on an earth anchor means 41. The continuous tension member 16 is looped over the eaves (33 and 34 with or without overhang(s)) and roof ridge 31 and over the eave cushions 20 and ridge cushion 21 after first positioning the cushions in a preconfigured arrangement under the continuous tension member 16, and then attached to the other earth anchor means 41, also depicted in FIG. 1 and FIG. 2. The at least one means for adjusting 11 (previously integrated into the continuous tension member 16) is tightened and the system is ready for use.

To uninstall and remove this version of the invention from the structure, if desired, the above-referenced installation procedure is reversed.

Figure 3:
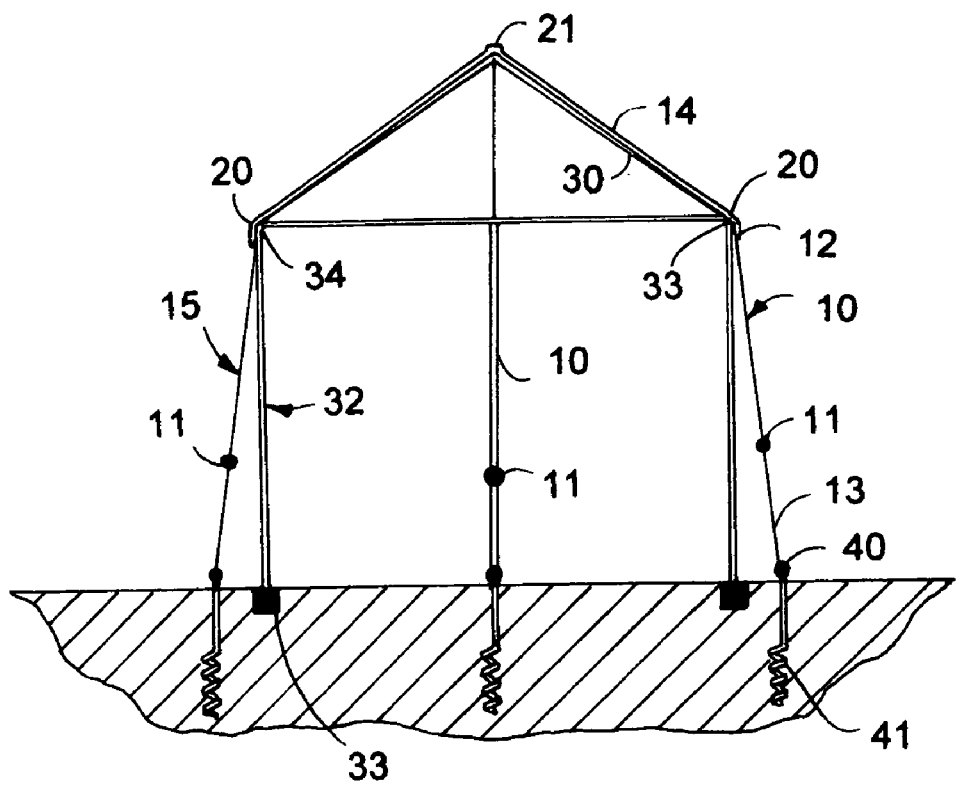
FIG. 3 is a sectional view of an alternate embodiment showing the plurality of earth anchors connected to tension members attached to the external roof net, tightened for emergency use.
Figure 4:
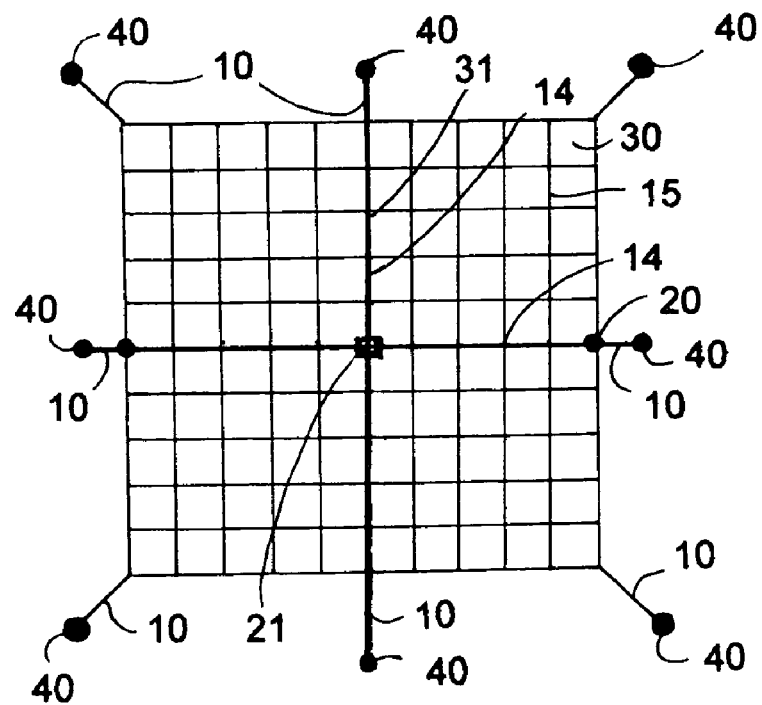
FIG. 4 is a plan view of an alternate embodiment showing the plurality of earth anchors connected to tension members attached to the external roof net, tightened for emergency use.

Another embodiment uses an external net anchored to at least one, a plurality or several earth anchor means as shown in FIG. 3, for the external tension member. The size of the net openings may be of any size but should be scaled to cover the average size of a residential roof shingle when used on houses, as shown in FIG. 4. For instance, the net opening could be sized to accommodate a typical residential roof shingle such as the standard 3-tab Sentinel Shingles manufactured by GAF Materials Corp. 1361 Alps Road, Wayne, N.J. 07470, (973)628-3000, which has an exposed surface of about 5 inches and about 13 inches wide. A net, for example, with openings of about 3 inches square would be sufficient for use in this application. Netting products such as those made by Global Net Service, Shengqun Zhou, 5-404 Nantong Road, Taizhou, Jiangsu Province, China 225300, Tel: 86-13901431072, Fax: 86-523-6666567, Email: sales@global-net-service.com may be used in versions of this invention. Nets have the advantage of allowing the high wind force to penetrate the net's surface (as do pliable mesh membranes, which also may be used) while restraining the roof shingles underneath the external net or external pliable mesh membrane from separating from the sub-roof, well known in the art.

These include fishing nets, fish nets, gillnets ropes, twines, cargo nets, construction and safety nets, sports nets, fishnets, hammocks, farming nets and ready to use nets which may be used in versions of the invention. Other types that may be used include: twisted knotted polyethylene & nylon nets, single strand, very strong and flexible and easily repaired, available in single or double knot; braided knotted nylon netting, which is more abrasion resistant than twisted netting, not quite as strong as twisted netting, more difficult to repair, more expensive, available in many colors and sizes (as are most nets); knotless nettings available in many sizes, lengths, and depths; monofilament nylon fishing net which is very similar to the twine commonly used in fishing reels, more abrasion resistant than multifilament netting, easily cleaned of debris, available in single, double knot, absorbs very little water (valuable in hurricane rains), available in many colors and sizes, all of which are listed as illustrative only and not intended to be limiting as to the types of nets or mesh pliable membranes that may used to practice versions of the invention.

All types of tie downs (as they are commonly known in the industry), with or without a means for adjusting, may be used as the tension member(s), such as those available at www.Alibaba.com on the World Wide Web (WWW). These include ratchet tie downs, industrial safety belts, lashing strap belts, high-intensity polyester belts, web sling belts, polyester webbing slings, rigging hardware, wire rope, chains, synthetic fiber lifting slings, steel wire ropes and rigging, cargo lashings, bungee cords, tow ropes, luggage straps and buckles which are listed as illustrative only and not intended to be limiting as to the types of tie downs that may used to practice versions of the invention.

The attachment means 40 for the external tension member tie downs to the earth anchors may be hooks, carabiners (such as those available at Rapid Response Gear at www.rapid-response.com, (888) 600-9116, manufactured by Omega Pacific, the modified D'biner, built from certified, aircraft-quality aluminum-alloy bar stock with internally-threaded gate-lock locking mechanisms which mean that the even under load, the locking mechanisms can still be manipulated by hand and eliminates sticking gates, UL Classified, meets and exceeds NFPA 1983 L, ANSI/OSHA strength and construction requirements and standards), hand-tied knots, clamps, friction-type locks and other similar attachment hardware may be used, which are listed as illustrative only and not intended to be limiting as to the types of tie downs that may used to practice versions of the invention.

Figure 5:
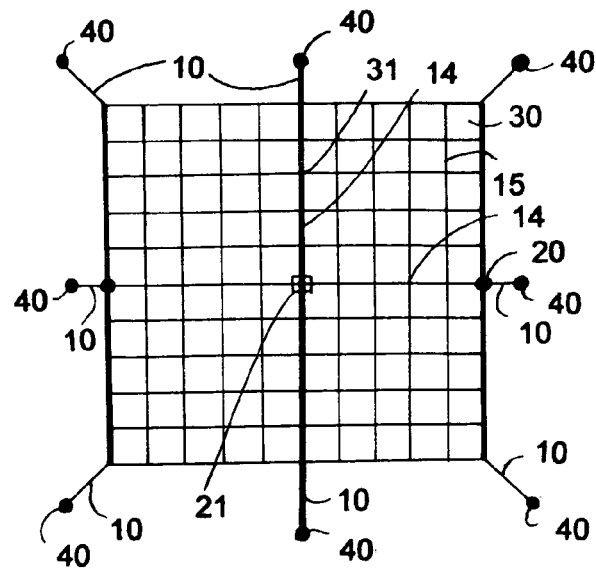
FIG. 5 is a plan view showing the continuous ridge cushion(s) and continuous eave cushion(s) under the external roof net.

To install and use another version of the invention on a structure, as shown in FIG. 3 and FIG. 4, typically the operator would first install a plurality of earth anchors 41 around the perimeter of the structure in a preconfigured arrangement and locations. Then, for example, the first end of a plurality of external first tension members 10, are attached to the attachment means 40 on a plurality earth anchor means 41. The plurality of external tension members 10 are attached to a net means 15 (as shown in FIG. 4) which is spread over entire roof surface 30, the eaves (33 and 34 with or without overhang(s)) and roof ridge 31 and over a plurality of eave cushions 20 and ridge cushions 21 (the cushions may be continuously disposed on the entire roof ridge 31 and roof eaves 33 and 34, with or without overhang(s), as shown in FIG. 5) after first positioning the cushions in a preconfigured arrangement and locations under the external net means 15, and then attached to the other plurality of earth anchor means 41, also depicted in FIG. 3, FIG. 4 and FIG. 5. The at least one means for adjusting 11 (previously integrated into the plurality of tension members 10) is tightened sufficiently and the system is ready for use. Or, both tension members in combination with a net may be used as shown in FIG. 4. Or, solely an external net may be used directly attached to the earth anchor means 41 via the attachment means 40.

To uninstall and remove this version of the invention from the structure, if desired, the above-referenced installation procedure is reversed.

Another embodiment of the invention is depicted in FIG. 7. This version is made and installed as previously described and may use only one earth anchor 41 located upwind from the wind force and connected to an external continuous tension member 16, using the optional bottom tension member 17 under the crawl space 35. Alternately, the external continuous tension member 16 may combine the bottom tension member 17 to comprise an external continuous tension member as depict in FIG. 7. This version may also use an external net means 15, with or without an external continuous tension member 16, alone or in combination. A bottom edge protector 22 may also be used in this version as shown in FIG. 7.

The above-referenced device and system is not limited to the enumeration of parts or exact details of construction disclosed herein, as these are merely examples and not meant to be limiting. The shape, number and sizes of each external tension member, external net and/or net means, earth anchors, earth anchor means, attachment means and all other components may be varied so as to accommodate specific items and use thereof. The size, shape and materials of construction of the various components can be varied as desired.

For example many buildings are designed using CAD (computer aided design) software programs, such as AutoCAD, available from Autodesk, Inc., 111 McInnis Parkway, San Rafael, Calif. 94903, USA, Phone: 415-507-5000, Fax: 415-507-5100. The CAD program can be combined with CAM (computer aided manufacturing) such as that available from BobCAD-CAM software, CADCAMDepot.com, 1981 Dunloe Circle, Dunedin, Fla. 34698. Toll Free Phone: 877-880-4488, International: 727-735-0584.

The CAD-CAM software enables a 3 dimensional (3-D) building/structure roof design to be integrated into the manufacturing process of the roof net or mesh pliable membrane to be used. Thus, the roof net may be manufactured to the precise tolerances and shape of the roof. Thus CAD-CAM enables versions of the invention to be practiced on more complex roof structures that involve several ridges, valleys, eaves, etc. as needed by the operator. Nonlinear, round, curved and any other shape roofs may utilize versions of the invention. It is understood that these CAD-CAM techniques are well known to one skilled in the art and may be used to practice versions of the invention.

Figure 6:
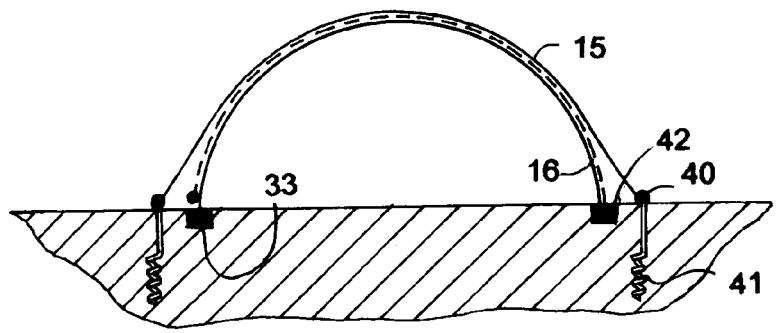
FIG. 6 is a sectional view of an arch-type structure with the external roof net used with or without additional tension members and earth anchors or alternately earth anchoring into the foundation of the structure.

Another embodiment of the invention may be used for aircraft hangars. This embodiment can be used for any aircraft hangar shape, but for illustrative purposes, FIG. 6 depicts an arch-shaped hangar 16 on a foundation 33. In this application, this version of the device and system may comprise solely an external net 15, with or without cushions, attached to a plurality of earth anchors, made and installed in a similar manner as the above-referenced roof eave and roof ridge type system. This embodiment may use external tension members and external netting or only use the external netting itself to restrain the structure and attached to the earth anchors. The attachment means 42 may be integrated into the existing concrete foundation 33, as shown with the external tension member and/or external netting in dotted lines connected to an attachment means 42 in the foundation 33 (also referred to as a footer or footing in the industry). This attachment means could be an eye bolt, U bolt, bent rebar or similar hardware is either installed when the foundation concrete is poured in liquid form prior to hardening or installed after the foundation concrete has hardened by drilling and securing with epoxy glue, expandable anchors, "red eyes" and other type concrete anchors, all well known in the industry.

The foregoing objects, benefits and advantages of versions of the invention are illustrative of those which can be addressed by versions of the invention and not intended to be limiting or exhaustive of the possible advantages that can be realized. These and other advantages will be apparent from the description herein or can be learned from practicing versions of the invention, both as embodied herein as examples or as modified in view of any variations which may be apparent to those of ordinary skill in the art. Therefore, the invention resides in the novel devices, methods, arrangements, systems, combinations and improvements herein shown and described as examples and not limited therein.

It is also understood that whenever and/or is used in this patent application it means any combination or permutation of all, one, some, a plurality or none of each of the item or list mentioned, which is not intended to be limiting but merely for example and illustration. It is also understood that (s) designates either singular or plural. It is also understood that that "or" is an inclusive "or" to include all items in a list and not intended to be limiting and means any combination or permutation of all, one, some, a plurality or none of each of the item or list mentioned. It is also understood that "including" means "including but not limited to" any combination or permutation of all, one, some, a plurality or none of each of the item or list mentioned.

As will be apparent to persons skilled in the art, such as an architect, engineer, designer, fabricator, net designer and other similar artisans skilled in the art, various modifications and adaptations of the structure and method of use above-described will become readily apparent without departure from the spirit and scope of the invention, the scope of which is defined in the claims. Although the foregoing invention has been described in detail by way of illustration and example, it will be understood that the present invention is not limited to the particular description and specific embodiments described but may comprise any combination of the above elements and variations thereof, many of which will be obvious to those skilled in the art. Additionally, the acts and actions of fabricating, assembling, using, and maintaining the preferred embodiment of this invention is well known by those skilled in the art. Instead, the invention is limited and defined solely by the following claims.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

APPENDIX A

Approved Tie Down Assemblies

| Number | Manufacturer | Product |
| --- | --- | --- |
| 1086 B-A | EPCO Mobile Home Products<br>1308 S. Kalamazoo Avenue<br>Marshall, MI 49068 | EPCO Ground Hog Mobile Home Anchors<br>Models: RH61-6, RH-51-6, DRH51-6, DRH61-6 |
| 1087 B-A | Stromberg Carlson Products<br>PO Box 164<br>226 E. 16th Street<br>Traverse City, MI 49684 | "Huggor" Mobile Home Tie Down<br>Models: 48/S, 48/D, T4-36S, T4-36D |
| 1088 B-A | Transtationary Foundation Systems<br>20131 James Couzens Highway<br>Detroit, MI 48235 | Transtationary Foundation Systems |
| 1102 B-A | Barker Manufacturing Company<br>730 E. Michigan Avenue<br>Battle Creek, MI 49016 | MH Pier/Tie Down Device<br>Models: MHAP-12, MHAP-13, MHAP-14, MHAP-15, and MHAP-16 |
| 1107 B-A | Imperial Stamping Co., Inc.<br>23852 Reedy Drive<br>Elkhart, IN 46514<br>Doc. 92-071 | MHA Corporation Home Anchors and Accessories<br>Models: MHA-SB-2, MHA-SB-3, MHA-SB-4, MHA-SB-6, MHA-SB-7, MHA-SB-8, MHA-MHA-SB-10, MHA-SB-12, MHA-SB-15-36, MHA-SB-15-48, MHA-SB-16, MHA-SB-17, MHA-SB-20, MHA-SB-21, MHA-SB-22, MHA_SB-26, MHA-SB-46, MHA-SB, |

APPENDIX A-continued

Approved Tie Down Assemblies

| Number | Manufacturer | Product |
|---|---|---|
| 1189 B-MH | Anchor Sur<br>Div. of Poly Foan Int'l.<br>1218 Lime Street<br>PO Box 684<br>Fremont, OH 43420 | MHA-2, MHA-4, MHA-6, MHA-8, MHA-10, MHA-12, MHA-14, MHA-16, MHA-20, MHA-21, MHA-22, MHA-24, MHA-26, MHA-33, MHA-39, MHA-40, MHA-56, and MHA-58<br>Mobile Home Anchoring System |
| 1196 B-MH | Barker Manufacturing Co.<br>730 E. Michigan Avenue<br>PO Box 460<br>Battle Creek, MI 49016 | Stable Safe MH Tie Down |
| 1198 B-MH | American Skirting Co.<br>6560 Bethuy Road<br>Anchorville, MI 48004 | The Crabline Tie Down Assembly |
| B-94-637 | Tie Down Engineering, Inc.<br>5901 Wheaton Drive<br>Atlanta, GA 30336 | Mobile home anchors.<br>Models: MI 2H, MI 2H6, MI 22, MRA, MRAX 48, and related accessories. |
| PA-96-004 | Home Pride, Inc.<br>2976 Lee Highway, Unit 2<br>Bristol, VA 24201<br>Doc. 96-32 | Mobile home anchors:<br>Models: HP-1, HP-3, HP-4, HP-10, HP-12, HP-13, HP-14, HP-17, HP-30.<br>The anchoring system consists of steel disk anchors, steel concrete anchors, expansion bolts, strapping, and related accessories. |
| PA-96-001 | Minute Man Anchors, Inc.<br>305 West King Street<br>East Flat Rock, NC 28726<br>Doc. 96-33 | Manufactured housing tiedowns:<br>Models: 650-DH 5/8, 4636-DH 3/4, 36X-DH, THDH, 650-DH 3/4, 4430-DH 5/8, 48X-DH, THDHLS, 650-DH 11/16, 4430-DH 11/16, 36-DH, FCI W/S, 636-DH 5/8, 4430-DH 3/4, 210-DH, FCII W/S, 636-DH 3/4, 4450-DH 5/8, 210-PDH, BUC W/S, 672-DH 3/4, 4450-DH 11/16, 210-JDH, SBNB, 860-DH 3/4, 4450-DH 3/4, 100-DH, MMASD2 MMA STRAP.<br>The anchoring system consists of earth auger anchors, strapping, cross drives, buckles, and related accessories. |
| PA-94-001 | Hydroflo Systems, Inc.<br>3729 Linden, S. E.<br>Wyoming, MI 49548 | Earth Anchor:<br>Developed to stabilize the inward bow or deflection of masonry block or concrete walls caused by lateral earth pressure resulting from backfill against the wall. |
| PA-97-001 | GOP Industry<br>19266 Berden<br>Harper Woods, MI 48225 | Mobile Home Anchor:<br>Four-hole chain connector link used as an extension in their patented Crab Line Tie Downs for mobile home installations. |
| PA-99-001 | Frenchy's Skirting, Inc.<br>34111 Michigan Avenue<br>Wayne, MI 48184 | Manufactured Housing Tie-Down:<br>Model: 031933<br>Provides anchorage to withstand wind forces and uplift. |
| PA-99-003 | Tie Down Engineering Inc.<br>5901 Wheaton Drive<br>Atlanta, GA 30336 | Foundation/Anchoring System<br>Model: Dirt System #59007<br>Concrete System #59008<br>Vector Dynamics - Foundation/Anchoring System<br>Provides foundation/achoring system for manufactured housing and modular buildings to resist wind loads as designated by HUD Code (MHCSS 3280.306). |
| 1474-BA | Tie Down Engineering, Inc.<br>5901 Wheaton Drive<br>Atlanta, GA 30336<br>(404) 344-0000<br>Submission PA-00-0001 | ABS FOUNDATION PADS:<br>Part #59300 - 2 sq. ft.<br>Part #59301 - 2.5 sq. ft.<br>Part #59302 - 3 sq. ft.<br>BEAM CLAMPS:<br>Part #59002 - Swivel Strap Connector<br>Part #59003 - 3" Swivel Strap Frame Connector (beam clamp)<br>Part #59004 - 4" Swivel Strap Frame Connector (beam clamp)<br>Part #59005 - Adjustable Swivel Strap Frame Connector (clamp)<br>Part #59011 - Flange Beam Clamp<br>Part #59009 - Longitudinal Beam Clamp<br>STABILIZER PLATE:<br>Part #59291 |
| 1488-BA | Benchmark Resources, Inc.<br>70 S. Grey Road<br>Auburn Hills, MI 48326<br>Submission PA-00-0002 | Benchmark Insulated Concrete Wall System<br>The Benchmark Insulated Concrete Wall System is an extruded polystyrene form with cold-formed stell channel and steel bar reinforced concrete wall system to be used both below grade and above grade residential and light commercial applications. |
| 1489-BA | Tie Down Engineering, Inc.<br>5901 Wheaton Drive<br>Atlanta, GA 30336<br>(404) 344-0000<br>Submission PA-00-0003 | Vector Dynamics - Foundation/Anchoring System for manufactured housing and modular buildings to resist wind loads as designated by HUD Code (MHCSS 3280.306).<br>Amend Product Approval No. 1464-BA to add 18 inch round foundation pier option. |

APPENDIX A-continued

Approved Tie Down Assemblies

| Number | Manufacturer | Product |
|---|---|---|
| 1490-BA | Tie Down Engineering, Inc.<br>5901 Wheaton Drive<br>Atlanta, GA 30336<br>(404) 344-0000<br>Submission PA-00- | Part No. 59013 - Tube<br>Part No. 59272 - Longitudinal Beam Clamp<br>Part No. 59282 - Longitudinal Link<br>Part No. 59310 - Foundation Pad<br>Part No. 59277 - Foundation Pad (Concrete)<br>Part No. 59373 - Foundation Pad (Concrete) |

What is claimed is:

1. An emergency structure restraint device, consisting of;
one earth anchor, and;
one external tension member of suitable length, width and depth, further comprising a first end and a second end, and;
one means for attaching disposed on the earth anchor, and;
a means for adjusting integrated into the external tension member, whereby when the first end of the external tension member is attached to the earth anchor via the means for attaching disposed on the earth anchor and the second end of the external tension member is looped over a structure and attached to the earth anchor via the means for attaching, the means for adjusting integrated into the external member is adjusted to a predetermined tautness.

2. The device of claim 1 further wherein the external tension member is a net further comprising apertures in the net of a desired size.

3. The device of claim 1 further wherein the external tension member is a means for netting.

4. The device of claim 1 further wherein the external tension member is a net further comprising apertures in the net with dimensions smaller than 3 inches wide by 3 inches high by any desired thickness in the net.

5. The device of claim 1 further wherein the means for attaching disposed on the earth anchor further comprises at least one hook.

6. The device of claim 1 further wherein the means for attaching disposed on the earth anchor further comprises at least one carabiner.

7. The device of claim 1 further wherein the earth anchor further comprises one mobile home screw type anchor.

8. The device of claim 1 further wherein the means for adjusting further comprises at at least one ratchet.

9. The device of claim 1 further wherein the external tension member is a nylon webbing tie down with integrated ratchet for tightening to a desired tautness.

10. The device of claim 1 further wherein the means for attaching is permanently affixed.

11. The device of claim 1 further wherein the means for attaching is releasable.

12. The device of claim 1 further wherein the earth anchor is a concrete foundation.

13. The device of claim 1 further comprising an edge protector between the external tension member and the structure.

14. The device of claim 1 further comprising a structure.

* * * * *